Feb. 6, 1923.
S. S. FRAZIN.
ADJUSTABLE MIRROR SUPPORT.
FILED MAY 17, 1922.
1,444,599.
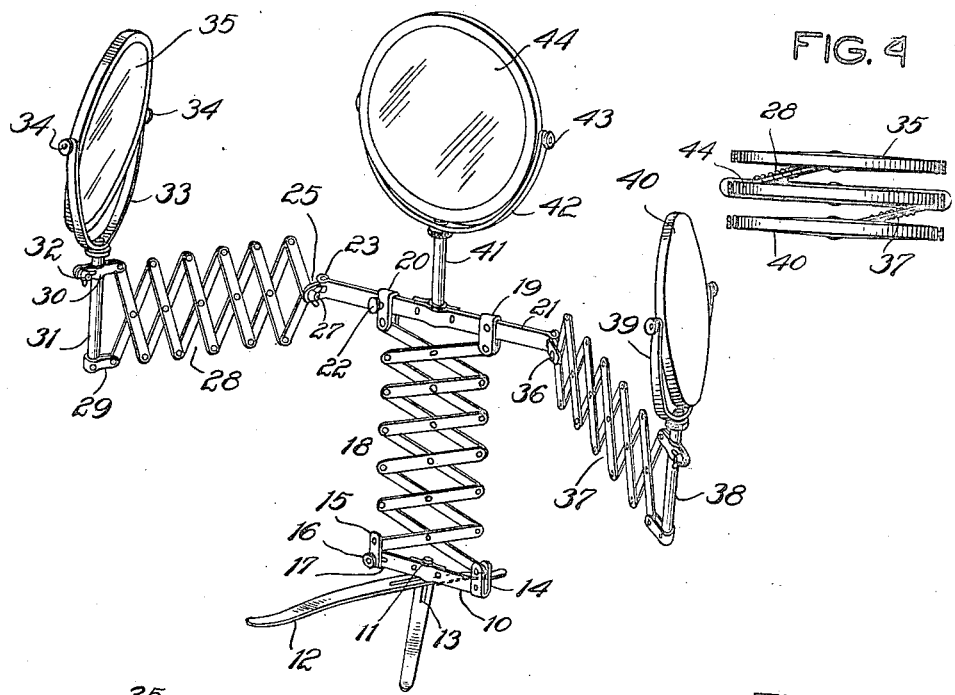
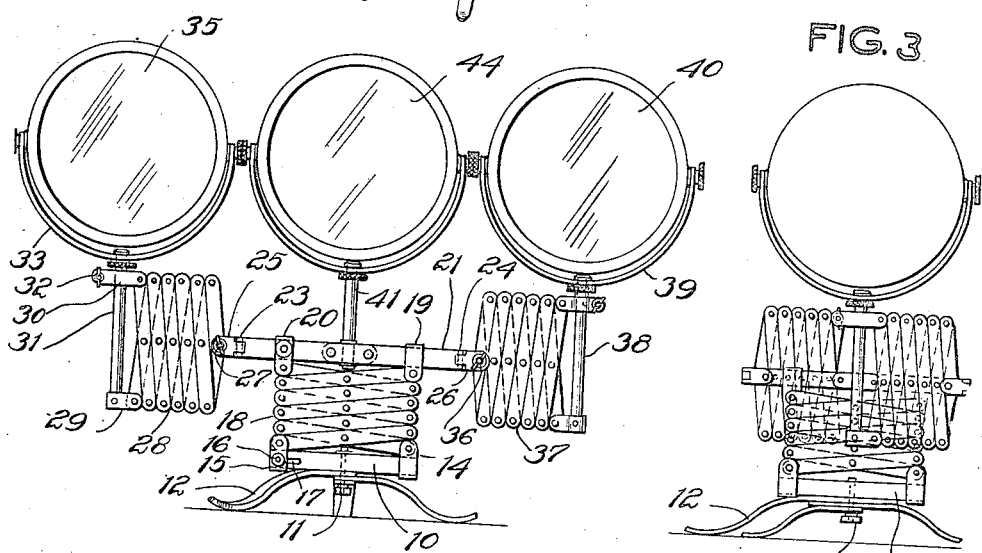
Inventor
Stanley S. Frazin
By Casper L. Redfield Atty Patented Feb. 6, 1923.

1,444,599

UNITED STATES PATENT OFFICE.

STANLEY S. FRAZIN, OF CHICAGO, ILLINOIS.

ADJUSTABLE MIRROR SUPPORT.

Application filed May 17, 1922. Serial No. 561,560.

*To all whom it may concern:*

Be it known that I, STANLEY S. FRAZIN, a citizen of the United States of America, and a resident of Chicago, county of Cook, and State of Illinois, have invented certain new and useful Improvements in Adjustable Mirror Supports, of which the following is a specification.

My invention relates to an adjustable support for mirrors, and has for its object the production of a device for supporting a plurality of mirrors, preferably three, in any desired relationship to each other.

In the accompanying drawings—

Fig. 1 is a perspective elevation showing three mirrors held in a position convenient for ordinary toilet purposes;

Fig. 2 is a front elevation with the mirrors side by side and with the expandible supports in their closed position;

Fig. 3 is a similar elevation with the mirrors folded upon each other; and

Fig. 4 is a plan of Fig. 3.

A horizontal base bar 10 has at its center a vertical pin 11 on which are pivoted legs 12. The pin 11 is a screw which may be tightened, and the legs have slots as shown at 13 in Fig. 1. As so constructed, the legs may be adjusted to a variety of positions and may be secured at any desired position by tightening screw 11. Secured on one end of the bar 10 is a bracket 14, and on the other end is a slidable bracket 15 which may be secured at any position by means of a screw 16 passing thru slot 17 in bar 10. Secured to the brackets 14 and 15 are the lazy tongs 18, the upper ends of which are secured to brackets 19 and 20. A horizontal cross bar 21 is permanently secured to bracket 19 and adjustably secured to bracket 20 by a set screw 22. It will be evident that by expanding or contracting the lazy tongs 18, the bar 21 may be raised or lowered with respect to the bar 10, or the support upon which the legs 12 may be standing. The lazy tongs 18 may be considered as an expanding and contracting standard.

On vertical pivots 23 and 24, at opposite ends of bar 21, are brackets 25 and 26 which are adjustable on said pivots. In bracket 25 is a screw 27 which serves as a horizontal pivot for the lazy tongs 28, and on the outer ends of the lazy tongs 28 are brackets 29 and 30 which support a vertical stem or rod 31. The bracket 29 is secured to the stem 31, but the bracket 30 is adjustable thereon. A screw 32 provided with a suitable thumb nut serves to secure the lazy tongs 28 to the stem 31 so as to retain the said lazy tongs 28 at any desired expansion or contraction. Another thumb nut on the screw 27 serves to retain the lazy tongs 28 at any desired position on said screw as a pivot.

Pivoted on the upper end of the stem 31 is a fork 33, and pivoted in this fork by means of pins 34 is a mirror 35.

The parts supported on the right hand end of the bar 21 are duplicates, in all particulars, of those just described as being supported on the left hand end. Briefly, they consist of the horizontal pivot 36, the lazy tongs 37, the stem 38, the fork 39 and mirror 40.

Mounted at the center of the bar 21 is a stem or standard 41 which corresponds to the stems 31 and 38. Pivoted upon stem 41 is a fork 42 having pins 43 upon which is pivoted a mirror 44.

When the lazy tongs 28 and 37 are closed (contracted) and are adjusted on their pivots 27 and 36 so that the stems 31 and 38 are vertical, the mirrors 35, 40 and 44 will have the relationship to each other that is shown in Fig. 2, which also illustrates the lazy tongs 18 as closed. The various parts are so proportioned to each other that, when the mirrors are in this relationship, the pivot 23 is directly below a point midway between mirrors 35 and 44, and pivot 24 is directly below a point midway between mirrors 40 and 44. If now the mirror 35 be turned backward on its pivot 23, and the mirror 40 be turned forward on its pivot 24, the mirrors will be folded upon each other into the position shown in Fig. 4. This view shows the three mirrors slightly separated from each other, but they are movable to contact with each other. The front elevation of this closed and folded position is shown in Fig. 3.

In folding the mirror 40 forward on the mirror 44, the faces of the two mirrors come toward each other, leaving the backs facing outward. In folding the mirror 35 backward on mirror 44, the face of 35 is normally outward. The mirror 35, however, is upon two independent pivots and turned upon either it can have its face inward. One of these is the pivoting of the fork 33 on stem 31, and the other is the pivoting of the mirror on the pins 34.

When the device is closed and folded as described, the screw 11 may be loosened and the legs 12 brought into the position shown in Fig. 3. In this position the legs are parallel with and below the folded arms, and may be secured thus by tightening screw 11.

It is to be observed that the lazy tongs 28 form an expanding and contracting arm which permits the mirror pivot 31 to be moved radially toward or from the end of the bar 21. Also, that the pivots 23 and 27 are at right angles to each other and form a universal joint upon which the mirror 35 may be moved in any direction about the adjacent end of the bar 21. In addition, the mirror pivots 31 and 34 are at right angles to each other and form a second universal joint upon which the mirror 35 may be made to face in any direction irrespective of its location with respect to the other parts of the apparatus.

In the same way the mirror 40 is on a universal joint on the outer end of the expanding and contracting arm 37, and said arm 37 is upon a universal joint composed of pivots 24 and 36.

What I claim is:

1. An expanding and contracting standard, a cross bar mounted upon said standard, a mirror supported at the center of the bar and at a position above the same, expanding and contracting arms pivotally connected to the opposite end of said bar, and mirrors supported on the outer ends of the arms and above the same on a level with the central mirror, said parts being so constructed that upon folding the arms upon the standard the outer mirrors will be folded upon opposite sides of the central mirror at a position above the standard and arms.

2. In a device of the class described, an expanding and contracting standard, expanding and contracting arms pivotally connected to opposite sides of said standard, said arms being foldable upon the standard, and mirrors supported on said standard and arms.

3. In a device of the class described, an expanding and contracting standard, a mirror carried on and supported above said standard, expanding and contracting arms pivotally connected to the upper part of said standard, and a mirror supported on the free ends of said arms, said parts being so arranged that upon contracting the standard and the arms and folding the arms upon the standard the three mirrors will be folded together.

4. In a device of the class described, a horizontal bar provided with means for supporting it in an elevated position, a mirror mounted upon and pivotally supported above the center of said bar, expanding and contracting arms pivotally connected to the ends of said bar and so constructed that the arms may be folded upon the bar, and mirrors pivotally supported at the ends of said arms.

STANLEY S. FRAZIN.